July 27, 1965  R. L. CHOLVIN ETAL  3,196,606
ANTIDETONANT CONTROL FOR TURBOCHARGED ENGINES
Filed Oct. 30, 1961  3 Sheets-Sheet 1

INVENTORS:
ALEXANDER SILVER,
ROBERT L. CHOLVIN,
WHANN & McMANIGAL
Attorneys for Applicants
by Robert M. McManigal

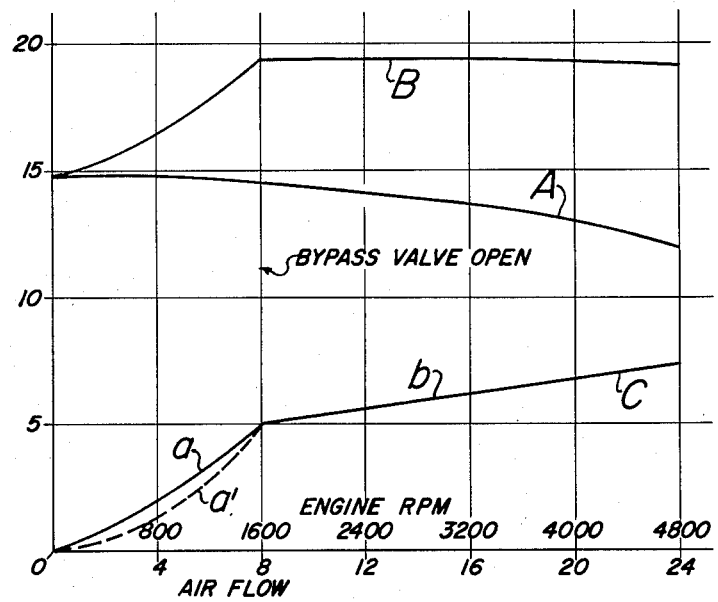
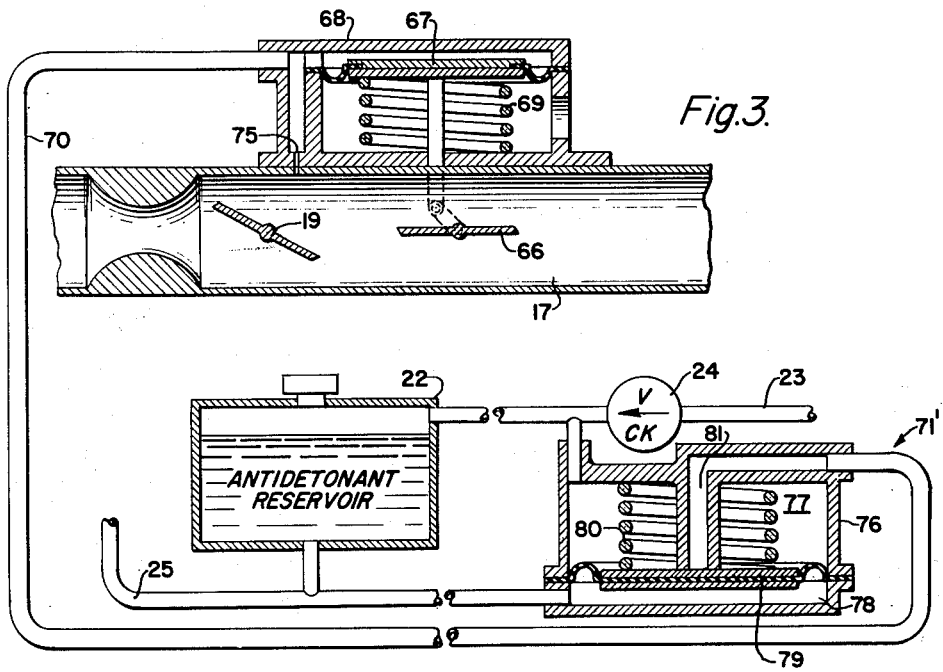

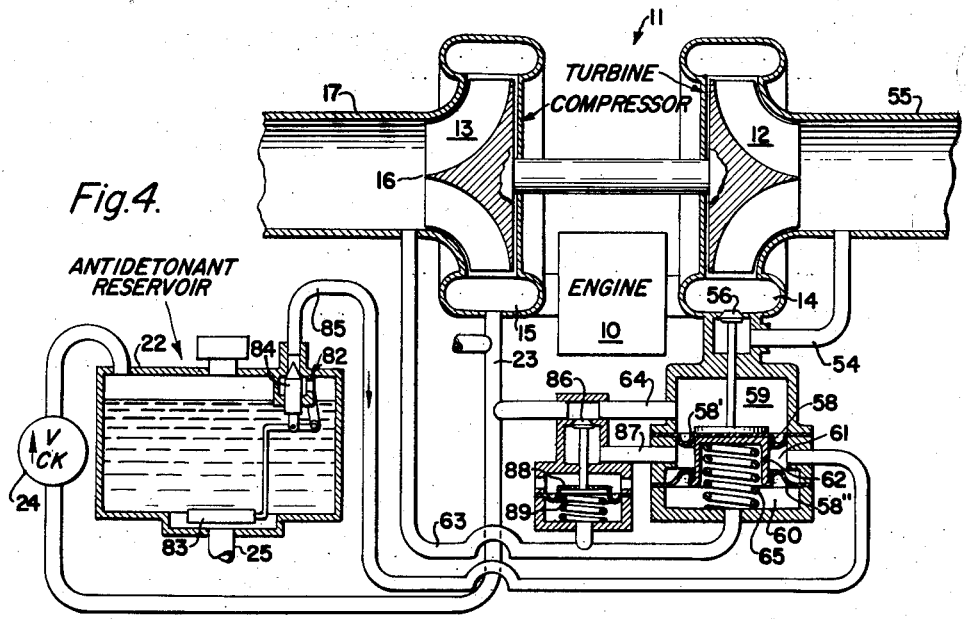
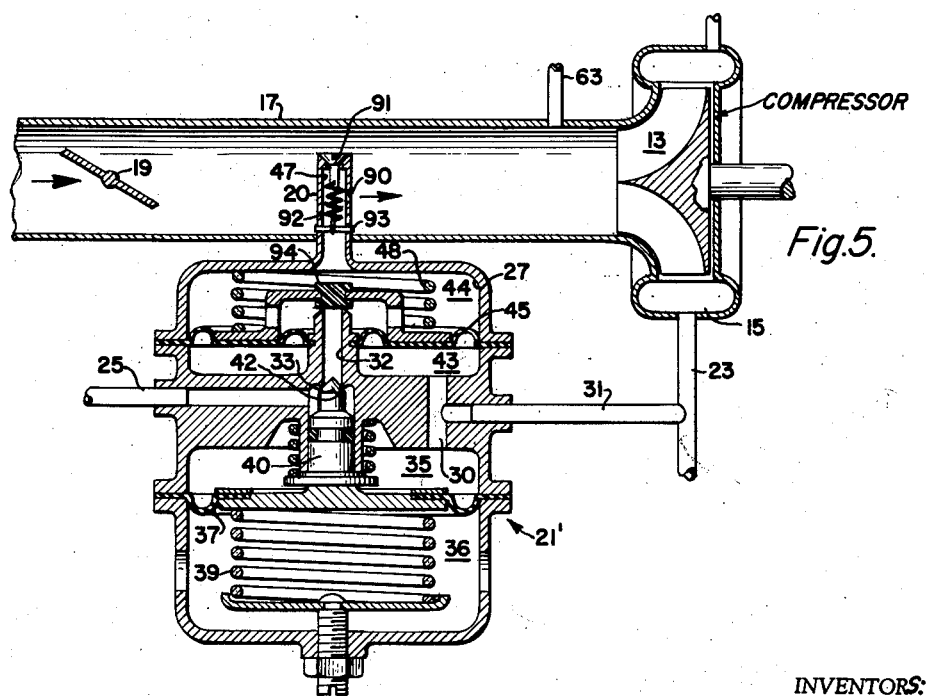

United States Patent Office 3,196,606
Patented July 27, 1965

3,196,606
ANTIDETONANT CONTROL FOR TURBO-
CHARGED ENGINES
Robert L. Cholvin, El Segundo, and Alexander Silver,
Tarzana, Calif., assignors to The Garrett Corporation,
Los Angeles, Calif., a corporation of California
Filed Oct. 30, 1961, Ser. No. 148,615
14 Claims. (Cl. 60—13)

The present invention relates generally to control means for feeding antidetonant fluid into the fuel-air mixture intake of an internal combustion engine, and is more particularly concerned with a combination of devices for injecting the antidetonant into the inlet fuel-air mixture of a turbocharger compressor downstream of a standard carburetor.

Heretofore, a considerable variety of devices and systems of more or less complexity have been devised and utilized for injecting supplemental liquid, such as water or other antidetonant, into the fuel delivered to the carburetor of an internal combustion engine to improve its operating characteristics under certain emergency and other conditions. Such arrangements have in general, been relatively complex and require specially designed and constructed carburetors and associated instrumentalities.

These conventional arrangements, however, are not readily adaptable for use with supercharged internal combustion engines such as now utilized in connection with automobiles and other engine driven vehicles. Having the foregoing in mind, it is one object of the present invention to provide an improved control arrangement or system for injecting antidetonant fluid such as water and methanol, and the like, into the inlet air-fuel mixture of the compressor of the turbocharger at a point downstream of the carburetor, thus permitting an installation to take effective advantage of a standard carburetor and atomization by the impeller of the turbocharger.

A further object is to provide relatively simple, inexpensive and effective means for controlling antidetonant injection to an approximate 1:30 ratio with mass air flow within reasonable tolerance and with sufficiently high injection pressures to provide atomization of the antidetonant prior to its entering the compressor.

A further object resides in the provision of an antidetonant control device which incorporated regulator means for providing a variable flow injection of the antidetonant into the fuel-air mixture from the carburetor, and which has a cutoff valve controlled by compressor discharge pressures.

A further object is to provide an antidetonant control having an improved injection nozzle which incorporates a combination of fixed and variable orifices.

A further object is to provide in an antidetonant injection system, an arrangement wherein the antidetonant injection nozzle is positioned in relatively close proximity to the compressor inlet of the turbocharger, whereby icing will be minimized.

It is also a further object to provide an improved arrangement of the character described which is compatible with rapid acceleration and rapid torque rise characteristics.

A further object is to provide an antidetonant control in combination with the turbocharger of an internal combustion engine wherein means are provided for bypassing engine exhaust with respect to the driving turbine as a function of the differential pressure existing across the compressor inlet and outlet.

A further object is to provide means for sensing compressor inlet pressure and reducing the normal boost pressure under cruising conditions where the carburetor butterfly valve is throttled to produce sufficiently high vacuum at the compressor inlet to be utilized for activation of an overriding device. In the present invention, use is made of the bypass valve for the turbine, and means provided for overriding control of this valve to reduce the turbocharger speed under the cruise conditions.

A still further object is to provide safety means which will reduce the boost pressure upon failure of the supply of antidetonant in the reservoir or failure to supply antidetonant to the injection nozzle.

Still another object is to provide an arrangement for cutting down the boost pressure upon failure to supply antidetonant, wherein auxiliary throttle means are provided ahead of the compressor inlet.

It is also an object to provide for the above noted purpose an alternative arrangement in which the boost pressure may be reduced by overriding the control for the turbine bypass valve.

Further objects of the invention will be brought out in the following part of the specification, wherein detailed description is for the purpose of fully disclosing the invention without placing limitations thereon.

Referring to the accompanying drawings, which are for illustrative purposes only:

FIG. 2 is a graph containing a series of curves illustrating certain operational features of the control of the present invention;

FIG. 3 is a diagrammatic view of a modification of the sensing means for controlling the auxiliary throttle valve utilized for reducing boost pressure under abnormal conditions;

FIG. 4 is a diagrammatic view of a modification showing the details of an overriding control for the turbine bypass valve; and FIG. 5 is a diagrammatic view of a variation of the antidetonant control of the present invention.

Figure 1:
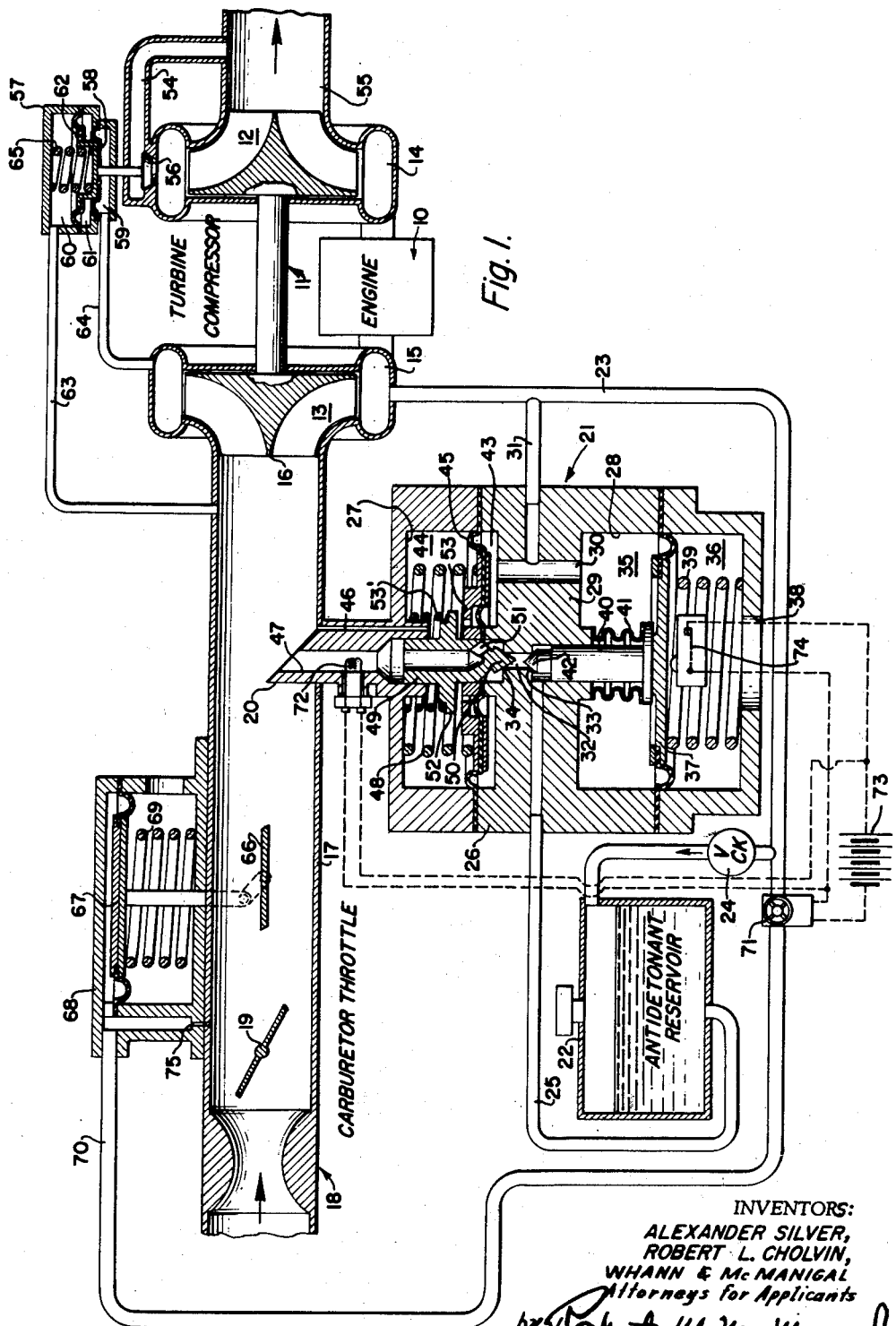
FIG. 1 is a diagrammatic view of antidetonant control for turbocharger internal combustion engines embodying the features of the present invention.

Referring more specifically to the drawings, for illustrative purposes, the components of the present invention are illustrated as being applied to a conventional turbocharged internal combustion engine installation in which the engine 10 is arranged for operation with a turbocharger 11 consisting of a driving turbine 12 and compressor 13. The turbine is connected with its inlet 14 to receive the exhaust gases from the engine, these exhaust gases being utilized to drive the turbine.

The compressor 13 is connected at its outlet 15 to provide boost pressure to the engine. The compressor has an inlet 16 which is connected through a supply duct 17 to a standard carburetor as diagrammatically indicated at 18 and containing the usual throttle valve control 19 for regulating the supply of fuel-air mixture furnished to the compressor intake.

Antidetonation is obtained by the introduction of antidetonant in such a way that the charge in the engine cylinders is cooled. Where a turbocharger is utilized in connection with the internal combustion engine, the compressor causes heating of the fuel-air mixture, and in the present invention it is proposed to inject the antidetonant into the fuel-air mixture between the standard carburetor and the inlet to the compressor, the antidetonant thus acting to cool and combat the detrimental heating effect due to compressing.

Basically, in its broad concept, the present invention provides means to control the ratio of the antidetonant to mass air flow, and in order to obtain greater differential pressure, an injecting nozzle 20 is positioned between the throttle valve 19 and the inlet 16 of the compressor, and in practice would be placed in relatively close proximity to the compressor inlet. Such an arrangement therefore provides for better atomization, better cooling, and better manifold distribution. This location also minimizes the possibility of freezing the antidetonant liquid.

The injection of the antidetonant fluid is under the control of a control and regulating device, as generally indicated at 21. This device, the details of which will be described subsequently, controls and regulates the flow of antidetonant from a supply reservoir 22 to the nozzle 20. Antidetonant fluid in the reservoir is pressurized through a conduit connection 23 from the boost pressure at the outlet 15 of the compressor, a check valve 24 being provided to trap the pressure in the reservoir in order to enable immediate availability of pressurized antidetonant through a supply conduit 25 to the regulating device under rapid engine acceleration from a standing start where boost pressure begins at a relatively low value.

The regulating device, more specifically comprises a housing structure 26 which is separated generally into compartments 27 and 28 by means of a dividing wall 29 having an intercommunicating passage 30 therein which is in communication with boost pressure conduit 23 through a connection conduit 31. The supply conduit 25 from the antidetonant reservoir communicates with one end of a bore passage 32 which is also formed in the dividing wall 29, the ends of this passage providing annular valve seats 33 and 34, respectively.

An "on" and "off" valve control for the antidetonant is provided, the actuation of the valve being by means of the boost pressure. For such purpose, the compartment 28 is divided into chambers 35 and 36 by means of a diaphragm 37. The chamber 35 is in communication with the boost pressure and subjects one side of the diaphragm thereto, while the chamber 36 is in communication with atmosphere through an opening 38. A spring 39 in the chamber 36 applies biasing pressure against the adjacent side of the diaphragm.

The diaphragm 37 has a central stem 40 which is supported for axial movement in the dividing wall 29 and is sealed against leakage with respect to the chamber 35 by a bellows seal 41. The stem 40 at its outer end is formed to provide a conical surface 42 adapted to be moved into seated and unseated relation with respect to the valve seal 33 to control the flow of antidetonant into the bore passage 32.

The compartment 27 is separated into chambers 43 and 44 by means of an annular diaphragm 45, the chamber 43 being in communication with boost pressure, while the chamber 44 is in communication with the interior of supply duct 17 through an auxiliary passage 46 in the nozzle 20 which is arranged as an extension of the housing structure 26 and contains a main bore 47 extending axially therein and through which the antidetonant is injected into the interior of the supply duct 17. The diaphragm 45 is biased against the action of the boost pressure by a spring 48.

Flow of antidetonant to the nozzle 20 is controlled by a variable area valve member 49 of generally tubular construction, which is supported at its ends for reciprocable movement, in the dividing wall 29 and the innermost end of the nozzle 20. The inner end of the valve member 49 is formed with a projection containing a conical surface 50 having valving relationship with respect to the valve seat 34 and providing a variable area opening by which the antidetonant may flow from the bore passage 32 and thence through a communicating opening 51 to the interior of the valve member and out through the main bore 47 of the nozzle. The valve member 49 has a circumferentially extending flange 52 which is associated with a biasing spring 53' acting in a direction to move the valve member towards seated position. The valve member is thus normally motivated to closed position when the "on" and "off" valve is closed.

Positive opening of the valve member 49, and its subsequent regulation as a function of compressor boost pressure, is obtained by providing an annular shoulder 53 on the diaphragm 45 which underlines the flange 52 so that when the diaphragm is subjected to boost pressure, the annular shoulder will be moved up against the biasing effect of spring 48 into engagement with the flange 52. This action is in such direction as to positively initially unseat the surface 50 with respect to the valve seat 34.

In general, there will be a need for antidetonant, when the boost pressure goes above approximately 5 p.s.i.g. The "on" and "off" valve may therefore be arranged to open at one to four p.s.i.g., while the variable area valve for controlling the injection of the antidetonant may be arranged to start opening at approximately 5 p.s.i.g. In the operation of the control means as described above, it is desirable to provide a waste gate or bypass valve which will operate on the turbine of the turbocharger to bypass the exhaust gases from the engine to the turbine exhaust discharge so as to reduce the boost pressure under certain operating conditions and prevent over-supercharging.

As shown diagrammatically in FIG. 1, a bypass passage 54 is provided for the turbine, this passage connecting the turbine inlet 14 with the turbine exhaust 55. The control of the bypass passage is by means of a valve 56 which is shown as being arranged to be operated as a function of the differential pressure across the compressor. More specifically the valve operator comprises a housing 57 having a double diaphragm 58 therein, this diaphragm separating the housing interior into chambers 59, 60 and 61, the chambers 60 and 61 being in communication through a restricted orifice 62. The chamber 60 is connected through a conduit 63 with the inlet 16 of the compressor, while the chamber 59 is connected through a conduit 64 with the outlet 15 of the compressor. There is also a biasing spring 65 in the chamber 60 which acts upon the diaphragm in such a way as to apply valve closing pressure thereto.

The control thus far described will now be described briefly with respect to its operation. Referring to the curves in FIG. 2 of the drawings, curve A shows the compressor inlet pressure change with respect to air flow under full throttle conditions, curve B the compressor outlet pressure, and curve C the differential pressure across the compressor. As shown in curve C, the portion $a$ indicates an area of rapid torque rise up to the point of approximately 5 p.s.i.g., above which antidetonation becomes extremely important. At this point, the waste gate or bypass valve 56 is arranged to be opened as a function of the differential pressure across the compressor. After the by-pass valve opens, the compressor differential rises at a fairly uniform rate requiring an increasing injector orifice area in order to maintain the desired antidetonant air ratio. This portion of the differential pressure curve of the compressor is indicated at $b$. The requirement for increased discharge of antidetonant fluid is fulfilled by the action of the variable area valve member 49 of the control and regulating device. Positive cracking of the valve 49 is assured by the action of the boost pressure on the diaphragm 45 which acts to raise the valve 49 at the required pressure differential. By proper choice of spring rates, an approximate linear effect is achieved. Although the curves in FIG. 2 are plotted for the fully open throttle, the same compressor differential characteristic exists regardless of engine intake manifold gauge pressure within the antidetonant operating range. With the arrangement as set forth herein, the injector orifice differential pressure is high and nearly equal to the compressor differential pressure, thus providing good velocity and atomization of the antidetonant fluid.

As a safety feature, it is desirable to provide means for reducing the boost pressure so as to prevent detonation in the event that there is a failure in the supply of antidetonant to the nozzle 20 due to a lack of antidetonant in the reservoir, or for some other malfunction. One arrangement for controlling this condition is to provide an auxiliary throttle valve 66 which is ordinarily in an open position, but which will be operated in response to a control signal to closed position in which it throttles the compressor inlet and thus prevents supercharging. As shown, the throttle valve 66 is connected with a diaphragm 67 within a housing 68, one side of this diaphragm being biased by a spring 69 on the side of the diaphragm which is at atmospheric pressure. The opposite side of the diaphragm is connected through a conduit 70 with the conduit connection 23 so as to receive and apply boost pressure to the diaphragm 67. Normally, the supply of boost pressure to the diaphragm 67 is prevented by means of an electrically operated valve 71 in the conduit 70, this valve being so arranged that it will be energized in closed position, and opened upon being de-energized. For controlling the valve 71, an electrical fuse or other appropriate device is mounted in the nozzle 20. This device is of such character that it will complete an electric circuit from a battery or other electrical source 73 to the valve 71 so long as the device is cooled by the injection of the antidetonant, but which will burn out or otherwise open the circuit whenever there is a failure of cooling antidetonant therearound. In order to provide for automatically maintaining the valve 71 energized during such times as the engine is not being operated, a switch 74 is associated with the diaphragm 37 in such a manner that the contacts of the switch will be automatically closed during such time as there is no boost pressure applied to the diaphragm. However, upon operating the engine at a power level to require antidetonant, the boost pressure will actuate the diaphragm to open the contacts of the switch 74 and place in circuit the fuse or other device 72 so as to provide the safety feature. The side of the diaphragm 67 which is subjected to boost pressure supplied through the conduit 70 is bled through a restricted orifice 75 into the supply duct 17.

Referring to FIG. 3, a modified safety device is disclosed in which the control of the throttle valve 66 is obtained through a pressure responsive device. More specifically, in the modified arrangement, instead of utilizing an electrically controlled valve 71, the arrangement provides for the use of a hydraulically operated valve 71' which is preferably positioned at a lower elevation than the position of the antidetonant reservoir 22, and briefly comprises a housing structure 76 separated into chambers 77 and 78 respectively by a movable diaphragm 79. The chamber 77 is in communication with boost pressure in conduit connection 23, and also contains a biasing spring 80. The chamber 78 is connected with supply conduit 25 and is therefore subject to the pressure of the antidetonant in the reservoir 22.

The diaphragm 79 is in valving association with the end of a tubular member 81 having connecting communication with conduit 70. So long as the tank contains antidetonant, the diaphragm 79 closes the end of tubular member 81 due to the higher pressure in chamber 78 resulting from the liquid head of antidetonant. However, should the supply of detonant in the reservoir become depleted, the pressures acting on the diaphragm will be in a direction to move it away from valve closing position and permit the boost pressure to be applied through conduit 70 to the operating mechanism of the throttle valve 66 to operate it in the manner and for the purpose previously explained.

A further modified arrangement for reducing boost pressure upon depletion of antidetonant in the reservoir is disclosed in FIG. 4. In general, this modified arrangement provides an overriding control for the turbine bypass valve 56 which acts to decrease the turbine speed and as a consequence reduce the boost pressure.

More specifically, in this modification the bypass valve 56 is connected for normal operation in the same manner as shown in FIG. 1. In order to provide overriding control, in response to depletion of antidetonant in the reservoir 22, the reservoir is provided with a float valve, as generally indicated at 82. A float 83 is arranged through a suitable linkage to normally retain a valve 84 in closed position with respect to a conduit 85 having communication with the reservoir so long as there is antidetonant therein. However, upon depletion of the antidetonant, the valve 84 opens and connects the boost pressure in the reservoir through the conduit 85 with the chamber 61 of the operating mechanism of the bypass valve 56. The diaphragms of this control are so proportioned that when boost pressure is applied to the chamber 61, the valve 56 will open and bypass operating exhaust from the engine in the manner previously explained, whereupon the turbine speed is reduced and the boost pressure reduced.

A further feature of the present invention resides in the provision of mechanism for reducing turbocharger boost differential pressure and turbocharger speed when the engine is operating under cruise or low power conditions, this mechanism being operative as a function of compressor inlet vacuum pressure. Cruising conditions are obtainable by means of overriding control which will now be explained. For illustrative purposes, the overriding control is shown as comprising a control valve 86 arranged to control flow of boost pressure from conduit 23 through a connection conduit 87 having communication with the chamber 61 of the bypass valve control. The valve 86 is actuated by a diaphragm 88 subjected to atmospheric pressure on one side, and to the action of a spring 89 and inlet pressure to the compressor on the other side. Thus, the valve 86 normally remains closed, but when the inlet vacuum pressure to the compressor reaches a predetermined magnitude, it operates against the action of the spring 89 and gradually opens the valve to connect boost pressure to the chamber 61 and provide overriding control of the bypass valve 56. The fluid pressure in chamber 61 now acts on diaphragms 58' and 58", which compose the double diaphragm 58, the diaphragm 58" having a relatively larger area than that of diaphragm 58'. Thus, under the overriding control condition the bypass valve will operate at a reduced differential pressure as compared to the differential pressure normally required to operate the valve, when boost pressure in the chamber 59 acts only on the smaller diaphragm 58'. Operation of the bypass valve acts as before to decrease the speed of the turbocharger and reduce the boost pressure.

While the control valve 86 has been illustrated as being operable by fluid pressures, other operating means may be employed for the valve, for example, the valve may be actuated by a solenoid controlled through an appropriate energizing circuit.

The antidetonant control as described above and shown in FIG. 1, is primarily arranged to regulate the injection of antidetonant after the opening of the bypass valve 56. It will be realized, however, that it may be desirable under some conditions of vehicle operations to provide for injections of antidetonant both before and after the opening of the bypass valve. It is therefore within the broad concepts of the present invention to provide an arrangement for such purpose, such an arrangement being shown in FIG. 5, which may be utilized with or without the auxiliary throttle valve 66, wherein parts corresponding to those previously described above have been indicated by similar numbers.

Referring to curve C of FIG. 2, it will be observed that air flow increases in proportion to the square root of compressor differential pressure (portion $a'$) up to the point where the bypass valve opens. Since flow through a fixed area orifice has the same relationship with differential pressure, the arrangement shown in FIG. 5, incorporates an injection nozzle in which a fixed orifice 90 is provided on the trailing side of the nozzle.

After the bypass valve opens, the compressor differential rises at a fairly uniform rate so that a variable orifice area will be required to maintain the desired antidetonant to air ratio. For such purpose, the nozzle bore 47 is closed at its outer end by means of a variable area poppet valve 91 which is spring loaded by a tension spring 92 having a spring rate so choosen with respect to the force area of the valve as to provide an approximate linear effect. One end of the spring 92 is connected to the valve 91, while its other end is anchored to a fixed pin 93. It is thus possible to provide flow through the variable orifice of the poppet valve, which, upon being added to the fixed orifice flow, will substantially conform to the uniform rise portion $b$ as shown on curve C in FIG. 2.

In the embodiment shown in FIG. 5, the regulating device 21' has been slightly modified over that shown in FIG. 1. The bore passage 32 is in this case controlled at its upper outlet end by means of a secondary shutoff valve 94 which is carried by the diaphragm 45 and operates to prevent leakage of antidetonant when the engine is shut down.

Various modifications may suggest themselves to those skilled in the art without departing from the spirit of my invention, and, hence, I do not wish to be restricted to the specific form shown or uses mentioned except to the extent indicated in the appended claims.

We claim:

1. Apparatus for supplying and controlling the injection of an antidetonant into the operating fuel-air mixture of an internal combustion engine, the mixture being supplied from a carburetor through a compressor of a turbo-supercharger driven by the engine exhaust, comprising: a reservoir for the antidetonant; nozzle means for injecting the antidetonant into the mixture upstream of the compressor; means for controlling flow of antidetonant from said reservoir to said nozzle as a function of differential pressure across said compressor; and means for bypassing engine exhaust from the inlet to the outlet of said turbine upon the occurrence of a predetermined differential between the compressor outlet pressure and the inlet pressure of mixture supplied from the carburetor, said controlling means and said bypassing means beginning to open at substantially the same pressure differential.

2. Apparatus for supplying and controlling the injection of an antidetonant into the operating fuel-air mixture of an internal combustion engine, the mixture being supplied from a carburetor through a compressor of a turbo-supercharger driven by the engine exhaust, comprising: a reservoir for the antidetonant; nozzle means for injecting the antidetonant into the mixture upstream of the compressor; means for controlling flow of antidetonant from said reservoir to said nozzle as a function of differential pressure across said compressor; means for bypassing engine exhaust from the inlet to the outlet of said turbine upon the occurrence of a predetermined differential pressure across said compressor; said controlling means and said bypassing means beginning to open at substantially the same pressure differential and overriding control for modifying said bypass in response to a condition of no antidetonant in said reservoir.

3. Apparatus for supplying and controlling the injection of an antidetonant into the operating fuel-air mixture of an internal combustion engine, the mixture being supplied from a carburetor through a compressor of a turbo-supercharger driven by the engine exhaust, comprising: a reservoir for the antidetonant; nozzle means for injecting the antidetonant into the mixture upstream of the compressor; means for controlling flow of antidetonant from said reservoir to said nozzle as a function of differential pressure across said compressor; means for bypassing engine exhaust from the inlet to the outlet of said turbine upon the occurrence of a predetermined differential pressure across said compressor; said controlling means and said bypassing means beginning to open at substantially the same pressure differential and overriding control for opening said bypass in response to a condition of no antidetonant in said reservoir, said overriding control including a reservoir float controlled valve.

4. Apparatus for supplying and controlling the injection of an antidetonant into the operating fuel-air mixture of an internal combustion engine, the mixture being supplied from a carburetor through a compressor of a turbo-supercharger driven by the engine exhaust, comprising: a reservoir for the antidetonant; nozzle means for injecting the antidetonant into the mixture upstream of the compressor; means for controlling flow of antidetonant from said reservoir to said nozzle as a function of differential pressure across said compressor; means for bypassing engine exhaust from the inlet to the outlet of said turbine upon the occurrence of a predetermined differential pressure across said compressor, said controlling means and said bypassing means beginning to open at substantially the same pressure differential and overriding cruising control for actuating said bypass means in response to changes in compressor inlet pressure.

5. Apparatus for supplying and controlling the injection of an antidetonant into the operating fuel-air mixture of an internal combustion engine, the mixture being supplied from a carburetor past a throttle valve and through a supercharger compressor, comprising: a reservoir for the antidetonant; nozzle means for injecting the antidetonant into the mixture between the throttle valve and the compressor; and means for controlling flow of antidetonant from said reservoir to said nozzle including a valve variable as to flow with the degree of opening produced in response to changes in the differential pressure across said compressor, said valve being normally urged towards a closed position.

6. Apparatus for supplying and controlling the injection of an antidetonant into the operating fuel-air mixture of an internal combustion engine, the mixture being supplied from a carburetor past a throttle valve and through a supercharger compressor, comprising: a reservoir for the antidetonant; means for pressurizing the antidetonant in said reservoir from the compressor outlet; a tubular member having an end positioned in the mixture flow path between the throttle valve and said compressor and forming a nozzle for the injection of antidetonant, said member communicating with an antidetonant supply passage; a poppet valve for variably controlling flow from said passage into said member, said valve having a variable area surface operatively associated with a valve seat and being normally urged towards a seated position; and pressure means acting to unseat said valve which varies as a function of compressor outlet pressure.

7. Apparatus for supplying and controlling the injection of an antidetonant into the operating fuel-air mixture of an internal combustion engine, the mixture being supplied from a carburetor through a supercharger compressor, comprising: a reservoir for the antidetonant; means for pressurizing the antidetonant in said reservoir from the compressor outlet; a tubular member having an end positioned in the mixture flow path upstream of said compressor and forming a nozzle for the injection of antidetonant, said member communicating with an antidetonant supply passage; a poppet valve for variably controlling flow from said passage into said member, said valve having a variable area surface operatively associated with a valve seat and being acted upon in seated position by a seating force including substantially the pressure at the compressor inlet; means acting to unseat said valve in response to a predetermined value of compressor outlet pressure; and an "on" and "off" valve responsive to compressor outlet pressure for controlling flow of antidetonant to said poppet valve.

8. Apparatus for supplying and controlling the injection of an antidetonant into the operating fuel-air mixture of an internal combustion engine, the mixture being supplied from a carburetor under control of its throttle valve to a supercharger compressor, comprising: a reservoir for pressurized antidetonant; an antidetonant injection nozzle positioned between said throttle valve and the inlet of said compressor; and means including a valve for variably controlling flow of antidetonant from said reservoir to said nozzle, the degree of opening of said valve being variable as a function of differential pressure across said compressor.

9. Apparatus for supplying and controlling the injection of an antidetonant into the operating fuel-air mixture of an internal combustion engine, the mixture being supplied from a carburetor through a compressor of a turbosupercharger driven by the engine exhaust, comprising: a reservoir for antidetonant; a fluid pressure connection to said reservoir for pressurizing the antidetonant therein; fixed nozzle means for injecting antidetonant from said reservoir into the mixture upstream of the compressor; a variable area nozzle for augmenting the fixed nozzle means in response to changes in differential pressure across said compressor; means for by-passing engine exhaust from the inlet to the outlet of said turbine upon the occurrence of a predetermined differential pressure across the compressor; fluid pressure actuated overriding control means for opening said by-pass; and means operative upon the occurrence of a condition of no antidetonant in said reservoir for connecting said overriding control means with the pressurizing fluid pressure in said reservoir.

10. Apparatus for supplying and controlling the injection of an antidetonant into the operating fuel-air mixture of an internal combustion engine, the mixture being supplied from a carburetor through a supercharger compressor, comprising: a reservoir for the antidetonant; means for pressurizing the antidetonant in said reservoir from the compressor outlet; nozzle means in the mixture flow path upstream of said compressor for the injection of antidetonant from said reservoir, said nozzle means including a plurality of discharge openings, one of said openings being of fixed area; and a supplemental variable area poppet valve controlling flow through the other of said openings as a function of differential pressure acting on said valve.

11. Apparatus for supplying and controlling the injection of an antidetonant into the opening fuel-air mixture of an internal combustion engine, the mixture being supplied from a carburetor through a supercharger compressor, comprising: a reservoir for the antidetonant; means for pressurizing the antidetonant in said reservoir from the compressor outlet; nozzle means in the mixture flow path upstream of sad compressor for the injection of antidetonant from said reservoir, said nozzle means including a plurality of discharge openings, one of said openings being of fixed area; a supplemental variable area poppet valve controlling flow through the other of said openings, said valve being actuated to varied opened positions as a function of the difference in fluid pressure acting on the valve in a closing direction and the fluid pressure acting on the valve in an opening direction; and spring means normally applying a predetermined closing force to said valve.

12. An antidetonant control unit for controlling the injection of an antidetonant into the induction fluid of an internal combustion engine, the induction fluid stream being ducted through a supercharger compressor to the intake of the engine, comprising: a housing having a compartment therein; a diaphragm separating said compartment into two chambers, one of said chambers being adapted for connection with the boost pressure side of said compressor; means for connecting the other of said chambers with the induction fluid stream at the compressor inlet including an antidetonant injection nozzle; means forming a passageway for antidetonant terminating in a valve seat in said other of said chambers; and a valve associated with seat normally urged towards a seating position and being movable away from said seat by said diaphragm.

13. An antidetonant control unit for controlling the injection of an antidetonant into the induction fluid stream of an internal combustion engine, the induction fluid stream being ducted through a supercharger compressor to the intake of the engine, comprising: a housing having a compartment therein; a diaphragm separating said compartment into two chambers, one of said chambers being adapted for connection with the boost pressure side of said compressor; a tubular nozzle member communicating with the other of said chambers, said nozzle being adapted to be positioned in the induction fluid stream of the compressor inlet and having a fixed discharge orifice and a variable orifice; a poppet valve operative to vary the flow in the variable orifice; a spring urging said poppet valve towards closed position; means forming a passageway for antidetonant terminating in a valve seat in said other of said chambers; and a valve associated with said seat normally urged towards a sealing position and being movable away from said seat by said diaphragm.

14. An antidetonant control unit for controlling the injection of an antidetonant into the induction fluid stream of an internal combustion engine, the induction fluid stream being ducted through a supercharger compressor to the intake of the engine, comprising: a housing separated into two compartments by a dividing wall; a first diaphragm separating one of said compartments into two chambers, one of said chambers being adapted for connection with the boost pressure side of said compressor; a tubular nozzle member communicating with the other of said chambers, said nozzle being adapted to be positioned in the induction fluid stream of the compressor inlet and having a fixed discharge orifice and a variable orifice; a poppet valve operative to vary the flow in the variable orifice; a spring urging said poppet valve towards closed position; means forming a passageway for antidetonant terminating in a valve seat in said other of said chambers; a valve associated with said seat normally urged towards a seating position and being movable away from said seat by said first diaphragm; a second diaphragm separating the other of said compartments into two chambers, one of which is opened to the atmosphere and the other of which is adapted for connection with the boost pressure; a valve for controlling flow of antidetonant in said passageway to said valve seat, said valve being connected to said second diaphragm and movable thereby to opened position; and spring means normally urging the second diaphragm in a direction to close its associated valve.

References Cited by the Examiner
UNITED STATES PATENTS

| | | | |
|---|---|---|---|
| 2,491,497 | 12/49 | Jorgensen et al. | 123—25 |
| 2,492,485 | 12/49 | King | 60—13 |
| 2,495,231 | 1/50 | Dickey | 123—25 |
| 2,551,836 | 5/51 | Gendreau | 123—25 |
| 2,560,213 | 7/51 | Cannon | 123—25 |
| 2,562,742 | 7/51 | Rowe et al. | 60—13 |
| 2,699,326 | 1/55 | Anderson et al. | 123—25 XR |
| 2,724,239 | 11/55 | Fox | 60—39.28 |
| 3,035,408 | 5/62 | Silver | 60—13 |
| 3,039,699 | 6/62 | Allen | 60—39.74 X |

RICHARD B. WILKINSON, *Primary Examiner.*
ROBERT R. BUNEVICH, JULIUS E. WEST,
*Examiners.*